United States Patent
Busse et al.

(10) Patent No.: US 10,981,548 B2
(45) Date of Patent: Apr. 20, 2021

(54) METHOD FOR COMPENSATING FOR LOW ACTUATING DYNAMICS OF A MECHANICAL BRAKE OF A TRANSPORTATION VEHICLE AND CONTROL DEVICE

(71) Applicant: VOLKSWAGEN AKTIENGESELLSCHAFT, Wolfsburg (DE)

(72) Inventors: Oliver Busse, Wolfsburg (DE); Frank Hausdörfer, Didderse (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/496,181

(22) PCT Filed: Mar. 19, 2018

(86) PCT No.: PCT/EP2018/056835
§ 371 (c)(1),
(2) Date: Sep. 20, 2019

(87) PCT Pub. No.: WO2018/177785
PCT Pub. Date: Oct. 4, 2018

(65) Prior Publication Data
US 2020/0156603 A1    May 21, 2020

(30) Foreign Application Priority Data
Mar. 28, 2017   (DE) .................... 10 2017 205 209.0

(51) Int. Cl.
*B60T 8/174*    (2006.01)
*B60L 7/26*     (2006.01)
(Continued)

(52) U.S. Cl.
CPC ............... *B60T 8/174* (2013.01); *B60L 7/26* (2013.01); *B60T 7/12* (2013.01); *B60T 8/172* (2013.01);
(Continued)

(58) Field of Classification Search
CPC ..... B60T 7/12; B60T 7/18; B60T 8/00; B60T 8/172; B60T 8/174; B60T 8/3215;
(Continued)

(56) References Cited

U.S. PATENT DOCUMENTS 6,022,084 A * 2/2000 Horn ................... B60T 7/20
                                                 303/15
6,079,791 A * 6/2000 Stumpe ................ B60T 8/00
                                                 303/15
(Continued)

FOREIGN PATENT DOCUMENTS

DE      4235502 A1    4/1993
DE     19810656 A1    9/1999
(Continued)

OTHER PUBLICATIONS

Search Report for International Patent Application No. PCT/EP2018/056835; dated May 30, 2018.

*Primary Examiner* — Robert A. Siconolfi
*Assistant Examiner* — San M Aung
(74) *Attorney, Agent, or Firm* — Barnes & Thornburg LLP

(57) ABSTRACT

A method for compensating for excessively low actuating dynamics of a mechanical brake of a transportation vehicle, wherein a dividing unit receives a predefinition for a target overall retardation of the transportation vehicle and determines a mechanical target braking torque based on the target overall retardation and signals the same to the mechanical brake. The dividing unit predicts a mechanical actual brak-
(Continued)

ing torque of the brake by a model of the brake actuator and, based on the predicted mechanical actual braking torque, by activating at least one predetermined transportation vehicle component that is different from the mechanical brake, to generate a compensation torque, by which a control deviation which results when adjusting the mechanical actual braking torque to the mechanical target braking torque is compensated and the target overall retardation results in the transportation vehicle.

20 Claims, 3 Drawing Sheets

(51) Int. Cl.
B60T 7/12 (2006.01)
B60T 8/172 (2006.01)
B60T 8/32 (2006.01)
B60T 13/58 (2006.01)

(52) U.S. Cl.
CPC .......... *B60T 8/3215* (2013.01); *B60T 13/586* (2013.01); *B60T 2201/02* (2013.01); *B60T 2201/12* (2013.01); *B60T 2270/604* (2013.01)

(58) Field of Classification Search
CPC .... B60T 13/585; B60T 13/586; B60T 13/665; B60T 13/686; B60T 2201/02; B60T 2201/12; B60T 2270/604; B60L 7/18; B60L 7/24; B60L 7/26
USPC ............................................................ 303/3
See application file for complete search history.

(56) References Cited

U.S. PATENT DOCUMENTS

| 2014/0324316 A1* | 10/2014 | Yao ................... B60T 8/1708 701/78 |
| 2014/0333123 A1* | 11/2014 | Kunz ................... B60T 8/267 303/3 |
| 2016/0236672 A1 | 8/2016 | Yanagida et al. |

FOREIGN PATENT DOCUMENTS

| DE | 102012020880 A1 | 4/2014 |
| DE | 102014108083 A1 | 12/2015 |
| DE | 102015215532 A1 | 2/2017 |
| EP | 2743151 A1 | 6/2014 |
| WO | 2006076999 A1 | 7/2006 |

* cited by examiner ated braking torque) to a mechanical setpoint braking torque in accordance with an electrical or digital request signal even when the brake pedal is unactuated. The setpoint braking torque can be requested, e.g., by an adaptive cruise controller. To adjust the actual braking torque to the setpoint braking torque, a regulator of the mechanical brake pumps brake fluid, by a pump, into a brake cylinder so that a brake pressure in the brake system of the mechanical brake is increased and as a result brake linings are pressed against brake disks. However, such a pump of a mechanical brake is not a pressure regulator for the brake pressure but rather a volume flow regulator, since the brake pressure is set indirectly by feeding the volume of brake fluid. The effective parameter is, therefore, the brake fluid which is delivered by the pump into the brake cylinder and which then causes the brake pressure which ultimately presses the face of the brake linings onto the brake disk and, therefore, brakes them by friction.

METHOD FOR COMPENSATING FOR LOW ACTUATING DYNAMICS OF A MECHANICAL BRAKE OF A TRANSPORTATION VEHICLE AND CONTROL DEVICE

PRIORITY CLAIM

This patent application is a U.S. National Phase of International Patent Application No. PCT/EP2018/056835, filed 19 Mar. 2018, which claims priority to German Patent Application No. 10 2017 205 209.0, filed 28 Mar. 2017, the disclosures of which are incorporated herein by reference in their entireties.

SUMMARY

Illustrative embodiments relate to a method for compensating low actuator dynamics of a mechanical brake of a transportation vehicle. The compensation takes place while a requested total deceleration is divided between the mechanical brake, on the one hand, and a second transportation vehicle component, on the other hand. Illustrative embodiments also relate to a control device for carrying out the method.

BRIEF DESCRIPTION OF THE DRAWINGS

An exemplary embodiment is described below. In this respect.

DETAILED DESCRIPTION

Figure 1:
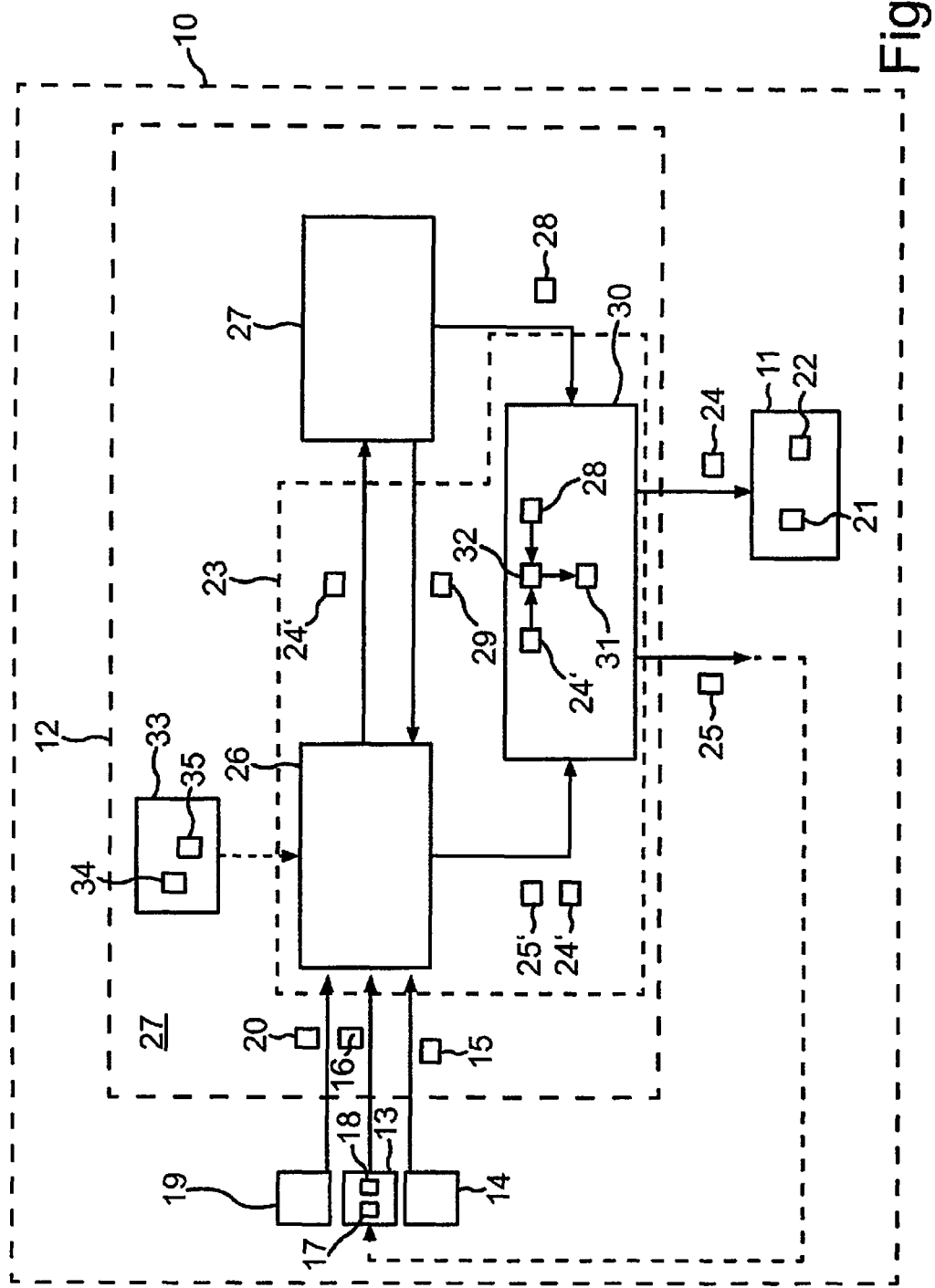
FIG. 1 shows a schematic illustration of an embodiment of a transportation vehicle with a disclosed control device.

A mechanical brake can adjust a mechanical braking torque (referred to below as a mechanical actual braking torque) to a mechanical setpoint braking torque in accordance with an electrical or digital request signal even when the brake pedal is unactuated. The setpoint braking torque can be requested, e.g., by an adaptive cruise controller. To adjust the actual braking torque to the setpoint braking torque, a regulator of the mechanical brake pumps brake fluid, by a pump, into a brake cylinder so that a brake pressure in the brake system of the mechanical brake is increased and as a result brake linings are pressed against brake disks. However, such a pump of a mechanical brake is not a pressure regulator for the brake pressure but rather a volume flow regulator, since the brake pressure is set indirectly by feeding the volume of brake fluid. The effective parameter is, therefore, the brake fluid which is delivered by the pump into the brake cylinder and which then causes the brake pressure which ultimately presses the face of the brake linings onto the brake disk and, therefore, brakes them by friction.

Every mechanical brake has here a characteristic curve which forms a relationship between the brake pressure and the delivered volume in the brake system. This characteristic curve has in the first approximation a parabolic profile, i.e., starting from a pressure-free state the delivery of the brake fluid by the pump firstly hardly changes the brake pressure, and only when further delivery of brake fluid occurs does the brake pressure rise. Therefore, in the initial phase of the buildup of torque the actuator dynamics are very low since the pump firstly delivers brake fluid without an appreciable change in the brake pressure occurring as a result.

An improvement in the actuator dynamics can mainly be brought about by increasing the rotational speed of the pump. However, the pump cannot be operated with a randomly high pump rotational speed, since this would give rise to appreciable noise. In other words, the dynamics of the brake actuator, i.e., in the case described the pump with the brake cylinder connected thereto, are limited. If a mechanical setpoint braking torque is prescribed with a rise over time or a gradient which is greater than the time gradient or the rise over time according to the actuator dynamics of the brake actuator, it is not possible to follow the time profile of the mechanical setpoint braking torque directly but instead there is a control error in the torque buildup phase during the adjustment of the mechanical actual braking torque to the mechanical setpoint braking torque.

In electrified transportation vehicles there are two possible ways of implementing a deceleration request of a cruise controller, that is to say a total setpoint deceleration. Cruise controller is meant to refer here, for example, to an automatic cruise control (ACC) system. On the one hand, the mechanical brake continues to be available and it can build up the brake pressure and, therefore, the mechanical actual braking torque either by a pump (for example, a pump of the ESC; ESC=electronic stability controller) or by an electric brake booster (EBB). On the other hand, recuperation by an electric machine in the traction drive provides a further, energetically more favorable possible way of implementing deceleration. The division of the braking force or of the braking torque or of the deceleration (negative acceleration) among the available actuating elements (recuperation and mechanical brake) is referred to as blending (blending over) or brake blending.

The available possible ways of implementing deceleration (recuperation on the one hand and mechanical brake on the other hand) have clearly different actuator dynamics. Recuperation is primarily influenced by driving behavior filtering, shock absorbers for avoiding drive train vibrations and battery performance, but can otherwise be operated with higher or greater actuator dynamics than a mechanical brake in the torque buildup phase. The mechanical brake with the described electric hydraulic pump must firstly actually supply or deliver a predetermined volume of brake fluid starting from the zero position in the torque buildup phase before it can follow a prescribed setpoint braking torque with sufficient actuator dynamics. Furthermore, the pressure buildup and reduction are subjected to increments which can arise, on the one hand, from the operating principle of the pump (for example, reciprocating piston) and, on the other hand, are attributable to the pressure regulating concept of the regulator of the mechanical brake.

In contrast, a mechanical brake functions reliably over the entire deceleration range which can be implemented by driver assistance systems. Although the recuperation must not be aborted, it is not sufficient to implement any deceleration of an assistance system for reasons of driving dynamics (only the driven axle is braked since an anti-lock brake system of the recuperation is not possible) and owing to the limited actuating range (overloading of the electric machine and/or of the battery).

From the energetic point of view it is appropriate to brake exclusively in a recuperative state until the actuating range limitation of the actuator (electric machine) is reached. However, this produces the problem that in the transient torque buildup phase, that is to say when the mechanical braking torque is built up and at the same time the mechanical setpoint braking torque rises or is increased, this transient torque buildup phase can have the described control error owing to the limited actuator dynamics of the mechanical brake. This is undesired in the case of driving dynamics intervention or emergency braking. If specifically a total setpoint deceleration with high dynamics is requested for a transportation vehicle, valuable time is lost until the setpoint braking torque which is specified according to the total setpoint deceleration is followed by the mechanical brake.

A transportation vehicle with division of the requested total setpoint deceleration between a hydraulic brake and a recuperation system is known, e.g., from DE 10 2012 020 880 A1.

Criteria for the strategic division of the total setpoint deceleration between a mechanical brake, on the one hand, and a recuperation system, on the other hand, are known from DE 198 10 656 A1.

The disclosed embodiments provide for the compensation of the actuator dynamics of a mechanical brake in a transportation vehicle to the effect that the limited actuator dynamics do not affect the provision of a requested total setpoint deceleration in a torque buildup phase of the mechanical actual braking torque.

The disclosed embodiments make available a method for compensating the actuator dynamics of the mechanical brake of a transportation vehicle if the mechanical brake prevents the transportation vehicle from following a signal for a prescribed mechanical setpoint braking torque. The method is based on the fact that in addition to the mechanical brake a transportation vehicle component, which is different from the mechanical brake, is also available for generating a torque. This torque is referred to below as the compensation torque. The transportation vehicle component can be, for example, a recuperation system. Furthermore, it is assumed that a dividing device is provided which receives a specification for a total setpoint deceleration of the transportation vehicle. In accordance with the total setpoint deceleration, the dividing device determines, in the described state, a mechanical setpoint braking torque and signals the mechanical setpoint braking torque to the mechanical brake so that the mechanical brake adjusts a mechanical actual braking torque to the mechanical setpoint braking torque by operating a brake actuator. The brake actuator can comprise, e.g., an electric hydraulic pump with a brake system (e.g., a brake line) to which brake fluid is applied by the pump. During the adjustment, the actuator dynamics of the brake actuator have, at least in one transient torque buildup phase of the actual braking torque, a limited time gradient which is lower than a time gradient of the signaled mechanical setpoint braking torque, so that a control error or a control difference or a control fault is produced during the adjustment.

In other words, the actuator dynamics of the brake actuator are lower than a change over time or the dynamics of the mechanical setpoint braking torque which is specified by the dividing device. The dividing device, therefore, predicts the mechanical actual braking torque by a model of the brake actuator in accordance with a current operating state of the brake actuator (e.g., current brake pressure) and in accordance with the gradient of the mechanical setpoint braking torque (i.e., the mathematical time derivative or gradient). In other words, which mechanical actual braking torque can be generated at a particular time by the brake actuator is known in the dividing device by the model.

By actuating the at least one predetermined transportation vehicle component which is different from the mechanical brake, the dividing device then generates a compensation torque in accordance with the predicted mechanical actual braking torque, which compensation torque brings about overall the total setpoint deceleration in the transportation vehicle. Despite the limited time gradient of the mechanical actual braking torque owing to the actuator dynamics of the brake actuator, the total setpoint deceleration is, therefore, achieved by virtue of the fact that the dividing device obtains the assistance of the at least one transportation vehicle component, or uses the component, in such a way that the influence of the actuator dynamics of the brake actuator is compensated by compensation torque which is generated thereby. The total actual deceleration is, therefore, set to the total setpoint deceleration.

The disclosed embodiments provide that the limited time gradient of the mechanical actual braking torque does not act on the total setpoint deceleration which is to be set or is prescribed. The actual time profile of the mechanical actual braking torque is predicted by the model, and a compensation torque is subsequently generated by the at least one predetermined transportation vehicle component.

The division of the total setpoint deceleration of the transportation vehicle which is requested, for example, by an adaptive cruise controller, into a mechanical setpoint braking torque for the mechanical brake, on the one hand, and a further setpoint braking torque, for example, for recuperation, on the other hand, can be carried out by the dividing device according to criteria which are known per se from the prior art, such as for example, wear optimization and/or optimization of the efficiency of the transportation vehicle. The dividing device can for this purpose be implemented by a processor device which can have at least one microprocessor and/or at least one microcontroller.

The disclosed embodiments also include developments whose features produce additional benefits.

To generate the compensation torque, at least one transportation vehicle component is actuated in the described way. In this case a recuperation system of the transportation vehicle and/or a retarder can be actuated as the transportation vehicle component. A recuperation system can comprise an electric machine as a generator and an electric energy store for storing electrical energy which is generated by the generator. A retarder is a hydrodynamic or electrodynamic sustained action brake. The compensation torque is generated in this case as a braking torque and is set to the value of the control error in the described transient torque buildup phase (gradient of the mechanical actual braking torque is lower than the gradient of the mechanical setpoint braking torque). In other words, an additional braking torque is generated as a compensation torque by the recuperation system and/or the retarder so that overall the mechanical setpoint braking torque which is specified for the mechanical brake is obtained from the sum of the mechanical actual braking torque and of the compensation torque.

As soon as the brake pressure in the brake actuator is sufficiently high (higher than a threshold value), the mechanical setpoint braking torque can be made available exclusively by the brake actuator itself, i.e., the actuator dynamics are then at least as large as the dynamics over time or the gradient of the mechanical setpoint braking torque. The compensation of the control error which occurs as a result of the transient torque buildup is also referred to below as transient compensation. The torque buildup phase is also referred to as "transient" here since it involves the changing of the fluid volume which is located in the brake cylinder, that is to say the delivery of additional brake fluid into the brake cylinder to follow the rising mechanical setpoint braking torque.

Such a transient torque buildup phase can occur, for example, if the total setpoint deceleration is not intended to occur any more from a mixture or simultaneous operation of a recuperation system/retarder, on the one hand, and a mechanical brake, on the other hand, but rather a specified, driving-situation-dependent proportion thereof is to be braked by the mechanical brake, as may also be necessary in the case of a driving dynamics intervention by a driver assistance system in the way described in the introduction (emergency braking, driving dynamic stabilization) or in the case of a braking operation by a driver.

When the brake pedal is activated and/or when there is a braking intervention signaled by the driver assistance system and/or when there is a recuperation abort a setpoint braking torque, specified by the dividing device, for the recuperation system and/or the retarder are/is gradually reduced, and the mechanical setpoint braking torque for the mechanical brake is increased, to blend over onto the mechanical brake. There are, therefore, resulting ramp functions for blending out the recuperation system and/or retarder and for blending in the mechanical brake. As a result the operator control of the brake pedal and/or the braking intervention of the driver assistance system is then implemented entirely or partially by the mechanical brake. As a result of the ramp-shaped blending over it is possible here for the control error which occurs at the mechanical brake in the transient torque buildup phase to continue to be compensated by the recuperation system and/or the retarder by the described compensation torque during the blending out until blending over completely to the mechanical brake has occurred.

When the mechanical brake has been completely blended in, the benefit described at the beginning that the mechanical brake can implement the total setpoint deceleration with a dynamic which results in a control error which is less than a predetermined or specifiable limiting value. Therefore, in the case of operator control of the brake pedal and/or of an intervention of a predetermined driver assistance system, for example, blending out of the recuperation occurs with simultaneous blending in of the mechanical brake. Until the entire blending over has occurred, the transient torque buildup phase continues to be compensated here, that is to say the transient compensation takes place.

It must, therefore, be expected that the division between a mechanical setpoint braking torque and a recuperation system is interrupted because a driver activates a brake pedal and/or because a predetermined driver assistance system signals a braking intervention and/or the recuperation system can no longer take up any energy any more. So that in this case the mechanical brake does not have to be started or actuated from the idling mode (brake pressure equal to 0) by the brake actuator, the mechanical brake may be prepared or prestressed (brake pressure buildup). For this purpose, even for the case in which the mechanical brake is not required but rather the specified total setpoint deceleration could be brought about entirely by the recuperation system, that is to say there is no request for the mechanical braking torque, the dividing device nevertheless brings about only part of the requested or specified total setpoint deceleration by the recuperation system and/or the retarder.

The dividing device brings about the remaining part by the mechanical brake. In other words, the mechanical brake is operated at least to make available the smaller part of the total setpoint deceleration, so that, therefore, the brake actuator has to build up brake pressure. As a result, the mechanical brake, therefore, already has to at least partially run through the transient torque buildup phase also without activation of a brake pedal and/or a braking intervention by the predetermined driver assistance system, that is to say has to fill the brake system (e.g., the brake line) with brake fluid by the pump until a brake pressure with a predetermined minimum value has built up. At the same time, the recuperation system and/or the retarder can maintain a braking torque reserve for the case in which even more mechanical braking torque is requested and again a transient torque buildup phase is brought about. In the case of the recuperation system, this can also be referred to as the recuperation reserve.

One development provides that a recuperation operation of the recuperation system is already reduced before a recuperation limit of the recuperation system is reached (actuating range limitation), and as a result a recuperation reserve is set as a predetermined constant value or is set adaptively by the model in accordance with a current operating state of the brake actuator. Therefore, the current actuator dynamics or the current gradient with which the brake actuator can change or increase the mechanical actual braking torque is/are taken into account. The recuperation system is, therefore, used to a maximum degree in this framework, but at the same time a braking torque reserve, such as the recuperation reserve, is maintained which is as large as is required by the current operating state of the brake actuator.

However, the mechanical brake should not be operated in a preventative state in this way for any requested total setpoint deceleration. The total setpoint may be divided by dividing into a mechanical setpoint braking torque and a recuperative setpoint braking torque for the recuperation system and/or a further setpoint braking torque for the retarder only for a total setpoint deceleration which is higher than a predetermined minimum value. In contrast, the mechanical brake remains unactuated for a total setpoint deceleration which is lower than the minimum value. The minimum value can be, for example, in a range from 0.2 m/s2 to 1 m/s2. The minimum value is also referred to below as the minimum recuperation.

The minimum value can also be set in a speed-dependent state. For example, there can be provision that the higher the velocity of the transportation vehicle the lower the minimum value.

It has hitherto been described that the dividing device compensates the control difference or control error between the mechanical setpoint braking torque and the mechanical actual braking torque of the mechanical brake by actuating the recuperation system and/or the retarder. An additional braking torque, such as the compensation torque, is, therefore, generated. A third option is predictive prestressing—that is to say the simultaneous, provisionally compensating buildup of driving torque and braking torque in a phase before a supposed deceleration request (e.g., in the case of an assisted parking process or parking-space-exiting process or when a predetermined safety distance from another road user is undershot). In the case of the actual buildup of deceleration (total setpoint deceleration), braking torque can then be simultaneously built up and drive torque can be reduced so that as it were a second brake component is artificially generated here.

However, use in a transportation vehicle with just one mechanical brake also can be considered. Here, a reserve can be formed by actively prestressing the drive train with respect to the brake, in a way which is analogous to the recuperation reserve described above and which can be formed by reducing the drive torque. Application possibilities for this arise whenever the achievable actuator dynamics of the brake have high priority over the fuel consumption of the transportation vehicle, for example, in the case of parking systems, driving over a kerbstone, a trailer maneuvering assistant or positioning assistant or when operating under rough offroad conditions. There can then be provision here that the mechanical brake is prestressed to prepare a braking maneuver, by specifying the mechanical setpoint braking torque. However, this occurs at a prescribed setpoint deceleration of 0.

In other words, the transportation vehicle is not to be decelerated at all and nevertheless the mechanical brake is to be prestressed, that is to say a brake pressure higher than 0 is built up. In this case, a drive motor of the transportation vehicle, that is to say an internal combustion engine or an electric motor, can be actuated as a transportation vehicle component. The compensation torque is then generated as the drive torque which is additionally generated by the drive motor. In this context, the compensation torque is not set to the described control error but rather to the value of the mechanical actual braking torque. In other words, the mechanical actual braking torque is acted against or counteracted by the drive torque as a compensation torque to the degree to which the mechanical brake generates the mechanical actual braking torque. Therefore, there continues to be a total setpoint deceleration of 0. Nevertheless, the mechanical brake is prestressed, i.e., a brake pressure higher than 0 is built up.

The method can be carried out for different specifications of the total setpoint deceleration. The dividing device can receive the specification for the total setpoint deceleration in each case at least once from an automatic cruise control system and/or a drive-by-wire system and/or from a drag torque simulation. A drag torque simulation can model the drag torque of an internal combustion engine in an electric transportation vehicle.

A hydraulic brake can be actuated as a mechanical brake, in hydraulic brake which the actuator dynamics are produced with the limited time gradient by filling the brake system of the hydraulic brake with brake fluid in the torque buildup phase. The brake system can comprise, e.g., a brake line.

The described model is configured or designed in such a way that a functional relationship of the delivered brake fluid volume and the brake pressure which is brought about as a result is approximated on the basis of a second order polynomial. This results in a calculation rule which can be carried out with low calculation expenditure for the time gradient. It is, therefore, also possible to calculate the time gradient by a microcontroller which can have a simple calculation unit. As an alternative to using a model it is also possible to provide for the brake pressure to be measured. The delivered brake volume can be calculated as a function of the time period and a rotational speed of the brake pressure pump.

The dividing device can be made available by a control device for a transportation vehicle. The disclosed embodiments also correspondingly comprise this control device which can be configured, for example, as a control unit. The control device can have a processor device which is configured to carry out an exemplary embodiment of the disclosed method. The processor device can for this purpose have at least one microcontroller and/or at least one microprocessor. The method can then be made available on the basis of a program code which, when executed by the processor device, carries out the method.

In the exemplary embodiment, the described components of the embodiment respectively illustrate individual features of the disclosure which are to be considered independently of one another and which each also develop the disclosure independently of one another and are, therefore, also to be considered components of the disclosure either individually or in a combination other than that shown. Furthermore, the described embodiment can also be supplemented by further features of the disclosure which are already described.

In the figures, functionally identical elements are respectively provided with the same reference symbols.

FIG. 1 shows a transportation vehicle 10, which can be a car, in particular, a passenger car, or truck. A mechanical brake 11, which can be controlled by a control device 12, is illustrated schematically. The brake 11 can be a hydraulic brake system with friction brakes for wheels of the transportation vehicle 10. The transportation vehicle 10 can also have a recuperation system 13 which represents generally in FIG. 1 a transportation vehicle component, different from the brake 11, for generating a compensation torque. Furthermore, a driver assistance system 14 is illustrated which can signal an intervention signal 15 for signaling a braking intervention to the control device 12. The driver assistance system can be, e.g., an ESC. The recuperation system 13 can signal a recuperation signal 16 to the control device 12, which signals available recuperation capacity. The recuperation system 13 can comprise an electric generator 17 and an electrical storage system 18, for example, a battery.

Furthermore, the transportation vehicle 10 can have an automatic cruise control system and/or adaptive cruise controller, or generally a drive train coordinator 19 (DTC) by which a total setpoint deceleration 20 can be signaled to the control device 12 in an automated state, i.e., without involvement of a driver. For example, a velocity of the transportation vehicle 10 can be adjusted to a setpoint speed higher than 0 or a distance of the transportation vehicle 10 from a transportation vehicle traveling ahead can be adjusted to a setpoint distance. In contrast to this, the driver assistance system 14 signals a braking intervention which is intended to slow down the transportation vehicle 10 independently of a target speed, in particular, is intended to bring it to a standstill. In contrast, the DTC 19 adjusts, in particular, to a setpoint speed which is higher than zero.

The control device 12 can utilize or actuate the mechanical brake 11 and the recuperation system 13 to implement or realize the total setpoint deceleration 20. The mechanical brake 11 can have a regulator 21 and a brake actuator 22 which is actuated by the regulator 21. A dividing device 23 can specify to the regulator 21 a setpoint braking torque 24 which the regulator 21 is intended to adjust by the brake actuator 22. The dividing device 23 can also specify or signal, in addition to the mechanical setpoint braking torque 24, a recuperative setpoint braking torque 25 for the recuperation system 13. The dividing device 23 can be an operating program of a processor device 27 of the control device 12.

The division of the total setpoint deceleration 20 into the two setpoint braking torques 24, 25 can take place in the dividing device 23 in a first operation by a strategic distributor 26. The strategic distributor 26 can be a program module of the operating program. The strategic distributor 26 can be configured in a manner known per se, i.e., can perform division into a strategic recuperative setpoint braking torque 25' and a strategic mechanical setpoint braking torque 24' on the basis of criteria which are known per se, such as, for example, the maximization of the economic viability of the operation of the transportation vehicle 10. In addition, priority can be given to the braking intervention of the driver assistance system 14 in accordance with the signal 15 and/or the activation of a brake pedal (not illustrated) to the effect that a corresponding braking request is implemented by a mechanical setpoint braking torque 24, that is to say recuperative braking does not take place or the braking is reduced gradually to 0.

To keep the mechanical brake 11 ready to react and/or to take into account actuator dynamics of the brake actuator 22 during the implementation of the mechanical setpoint braking torque 24, a model 27 for the current strategic mechanical setpoint braking torque 24' can determine which mechanical actual braking torque 28 can be made available by the brake actuator 22 for the brake pressure which is currently available in the mechanical brake 11. Furthermore, parameters for calculating a recuperation reserve, which are described below in conjunction with FIG. 2, can be signaled as parameters 29 to the strategic distributor 26 on the basis of the model 27 and the mechanical actual braking torque 28 which is calculated therewith.

An actuator division method or mechanism 30 can add a value for a compensation torque 31 to the strategic recuperative setpoint braking torque 25', to set the recuperative setpoint braking torque 25 as a specification for the recuperation system 27. The compensation torque 31 can be determined by a comparison 32 of the strategic mechanical setpoint braking torque 24' with the mechanical actual braking torque 28 which can actually be made available, as is signaled by the model 27.

The model 27 is described below with respect to FIG. 3.

The strategic distributor 26 can also receive, for example, from a data memory 33, further parameters for operation, for example, a value for a minimum recuperation 34 and an assignment 35 for a recuperation portion as a function of a velocity of the transportation vehicle 10.

Figure 2:
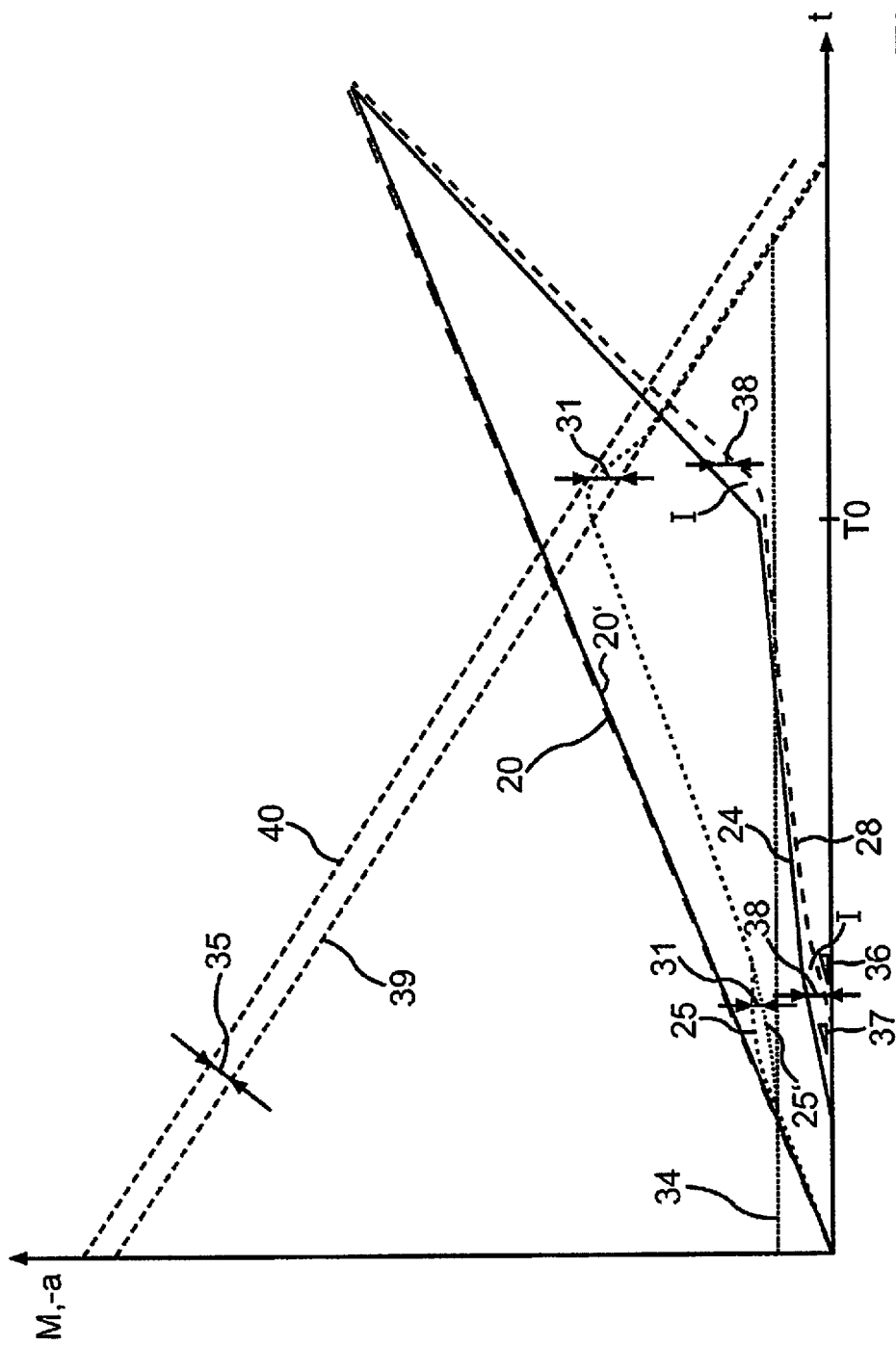
FIG. 2 shows a diagram with schematic profiles of signals such as can arise during operation of the transportation vehicle in FIG. 1 based on an embodiment of the disclosed method plotted against the time t.

FIG. 2 illustrates once more the relationship in a diagram in which the signaled braking torques and the resulting braking torques are plotted against the time t as time signals of the braking torque M and the deceleration –a (negative acceleration a). The total actual deceleration 20' is obtained for the signaled total setpoint deceleration 20, which total actual deceleration 20' can be kept on the profile of the total setpoint deceleration 20 by the control device 12 in all situations.

The total actual deceleration 20' can occur on the basis of the recuperation system 13 below the minimum recuperation 34, i.e., a corresponding strategic recuperative setpoint braking torque 25' is signaled. Given a total setpoint deceleration 20 which is above or higher than the minimum recuperation 34, the mechanical brake 11 can be prestressed or activated by specifying the mechanical setpoint braking torque 24, so that the brake actuator 22 builds up a brake pressure. However, this takes place with limited actuator dynamics so that a time gradient 36 of the actual braking torque 28 is lower than a time gradient 37 of the specified mechanical setpoint braking torque 24. A control error 38 is produced in the regulator 21. During the buildup of the brake pressure, a transient torque buildup phase I with a control error 38 is produced. However, the mechanical actual braking torque 28 is predicted by the model 27, so that the control error 38 can be compensated by specifying the compensation torque 31 and the resulting recuperative setpoint braking point 25 (strategic setpoint braking torque 25'+compensation torque 31) in such a way that the total setpoint deceleration 20 is obtained overall as the total actual deceleration 20'.

In FIG. 2 it is assumed by way of example that the recuperation is aborted at a point in time T0 because the recuperation system 13 signals, by the recuperation signal 16, e.g., that electrical energy cannot be taken up any more. At the point in time T0, a recuperation limit 39 is reached and then even though deceleration torque/deceleration force continues to be built up according to the total setpoint deceleration 20, recuperation torque is decreased or reduced by decreasing the speed or even the progress of time, following the recuperation limit 39 or complying with it. T0, therefore, arises from the point of intersection of 25 and 39.

However, the recuperation reserve 35 is taken into account here, i.e., the aborting of the recuperation takes place earlier than recuperation 40 which was actually available would allow, to be able to generate, during the further increasing of the mechanical setpoint braking torque 24 by the recuperation system 13, the control error 38 which continues to occur, after the ending or ramping out of the recuperation by the recuperation reserve 35 of the recuperation system 13 by generating the compensation torque 31. In other words, the recuperation is already aborted by the strategic recuperative braking torque 25' when there is a strategy recuperation limit 39 which is lower than the actually available recuperation 40.

At the point in time T0, the control error 38 is additionally also reduced by virtue of the fact that the brake 11 is already prestressed in comparison with a run up of the brake from a brake pressure 0, because the brake 11 has already been activated starting from the minimum recuperation value 34.

At the point in time T0, the ramping out of the recuperation starts, and the portion of the total actual deceleration 20' which is provided by the mechanical brake 11 is increased, by increasing the mechanical setpoint braking torque 24, until the portion is 100%.

Instead of the simple arithmetic division, the implementation of the dividing device which will now be described once more in more detail from now on and which is made available by the control device in FIG. 1, therefore, takes place according to an additional criterion.

The strategic distributor 26 defines a recuperation torque which is appropriate for the current operating state, from a minimum recuperation torque 34 (for reasons of comfort and efficiency), a, for example, speed-dependent recuperation limit which is used to ensure that recuperation is extended to low speeds, and a strategic recuperation reserve 35.

The strategic distributor also extrapolates the gradient of the request and evaluates, for example, when and to what degree the mechanical brake would be actuated if the input gradient were constant. The distributor forms a recuperation reserve 35 from this in accordance with, for example, the input dynamics of the total setpoint deceleration 20, the actual current braking torque 28 on the mechanical path (friction brake) and parameters from the actuator model 27 of the friction brake 11, to be able to compensate the transient behavior of the mechanical brake 11 therewith. In addition to the extrapolation, a fixed reserve can also be held in reserve.

If a driving dynamics intervention occurs, the strategic distributor moves the braking torque extracted, by the engagement of the recuperation, into the mechanical brake and maintains it for the current deceleration process using a drag pointer logic (peak hold) there until the deceleration is decreased by the requester. Slow movement back from the peak hold into the recuperation can optionally be configured when the intervention is passed. During the movement into the mechanical brake, the strategic distributor can continue to indicate its actual recuperation request to avoid putting possible pilot control of driving dynamics control at risk.

The model 27 for a slow brake actuator 22 models the time behavior of the mechanical brake as precisely as possible. A simple model could be implemented, e.g., by a first order low pass filter (PT1 element). A better model provides a description by a quadratic approximation of the braking behavior according to FIG. 3. If feedback about the braking force which is actually provided/implemented is present on the system side, this is read indirectly and passed through. Nevertheless it may be appropriate to calculate the model further in parallel, since it not only supplies an actual braking torque but also an available pressure gradient, on the basis of its simple mathematical derivability, or else braking torque gradients at a given pressure or braking torque. This information is valuable for the strategic distributor to be able to calculate its recuperation reserve more precisely.

The actuator division 30 uses the setpoint values from the strategic distributor and from the feedback from the model of the slow actuator to calculate the actuator division depending on a recuperative and a mechanical setpoint braking torque.

For the calculation of the recuperative setpoint braking torque, that braking torque which is already requested, but not yet implemented, on the mechanical path is added to the strategic recuperation setpoint torque.

The described approach for dividing the braking torques takes into account the various requests to the deceleration process which are discussed and explained below.

Prioritization of the Recuperation

Small decelerations are carried out recuperatively and are, therefore, efficient. Furthermore, as a result of the use of the recuperation in the range just below the acceleration zero point of the transportation vehicle, a significantly improved deceleration comfort level is obtained for the driver in comparison with the mechanical brake with the hydraulic pump, which comfort level has been found empirically to react sensitively to operations in the jolt profile, valve rattle and running noise of the hydraulic pump, even in this very small deceleration range.

Preconditioning of the Mechanical Brake Actuator

The mechanical brake is adjusted with a comparatively low gradient to a defined torque level and, therefore, pressure level after the consumption of the minimum recuperation. The low pressure gradient at the start results in beneficial running of the pump in a way which is unobtrusive in acoustic terms. The defined pressure level, which is formed taking into account the actuator parameters from the model of the brake system and taking into account the request dynamics, ensures, on the one hand, that there is a significant improvement in the following behavior of the mechanical brake and, therefore, partial avoidance (extending as far as complete avoidance depending on the design) of the transient behavior when the recuperation limit is reached. Furthermore, contamination and corrosion of the brake disks is prevented.

As a result of the buildup of a mechanical deceleration portion after a defined minimum recuperation has been reached, the brake pedal sensation, which depends decisively on the pressure which is already present in the brake system, can be reproduced for the driver: given identical deceleration (with respect to the roll-up deceleration of the transportation vehicle) the identical pedal sensation is always produced.

Compensation of the Transient Behavior of the Torque Buildup Phase I

In addition to the division of the sum torque between the two available deceleration actuators, the performance limitations of the electrically activated mechanical brake which depend on the pressure and available gradient are very largely eliminated. This is done by additionally applying on a temporary basis the deviation, determined by a model or measurement, between the mechanical setpoint braking torque and actual braking torque on the recuperative braking path. This is in principle a transient compensation analogous to the division of the drive torques or drive forces between the internal combustion engine and the electric machine or machines in hybrid transportation vehicles, but with an effect or division between the recuperation and friction brake. A "reserved" recuperation range, referred to here as the "recuperation reserve", which is not available to the strategic distributor to request recuperation ensures that the actuator distributor can recuperatively adjust in the short term a large part of the mechanical braking torque which is not built up.

The recuperation reserve itself can be constant or be formed in accordance with the operating point, e.g., the gradient and current sum setpoint braking torque. In a disclosed embodiment, the actuator model or the parameters thereof and the mechanical braking torque or pressure level which has already been built up during the preconditioning phase are taken into account during the formation of the recuperation phase. This can lead to a situation in which the reserve is very large at a low pressure level, and conversely only a very small reserve is then necessary when the pressure level reached at the mechanical brake is already high. In yet a further disclosed embodiment, this trade off (less recuperation reserve but higher pressure level as opposed to a large recuperation reserve with a low pressure level from the preconditioning) of the control device (FIG. 1) can be also transferred as a parameter by the recuperation requester.

The method functions well if it is the only distributor of deceleration force or braking torque at the time of its activity—its input signal must be correspondingly already arbitrated. Given a conventional implementation of the driver assistance systems, this is unproblematic because the entire controller chain, in particular, the dynamic controller which is arranged upstream of the control device, is generally used repeatedly for all the requesters on the same physical levels and is itself, therefore, already supplied with an arbitrated signal.

The automated transient compensation and, in the case of at least one disclosed embodiment, also the calculation of the target deceleration torque in the preconditioning phase and the recuperation phase depend on the quality of the brake pressure/deceleration model.

In a case of doubt it can be that the parameters which are selected by the control device do not constitute the optimum for the ideal deceleration profile and, therefore, efficiency or transient compensation are not be achieved in an optimum state depending on the direction of the deviation. However, a perceptible improvement is reliably achieved.

The transient compensation itself depends not only on the achievable gradients of the mechanical brake but also on the absolute braking torque which has already been set or the included pressure. As is described in the derivation of the brake pressure model which is also explained in conjunction with FIG. 3, numerous simplifications have been made in this model which is proposed here for use. Owing to these limitations, transient compensation could lead to a situation in which the sum braking torque turns out to be temporarily too low (insufficient compensation) or too high (transient behavior over-compensated).

This effect can be attenuated by a plurality of measures: on the one hand, conscientious parameterization of the model gives rise to a relatively high quality of the calculated values, and on the other hand in relatively high transportation vehicle classes sometimes a value which is adjusted with the pressure sensor system and is made available for the actual value of the set braking torque by the brake itself can be read in. When this value is used, the model is required only for the calculation of the achievable gradients, which makes the transient compensation even more robust with respect to model errors (which explicitly does not mean that purely transient compensation which is based on the described model is problematic). In practice, the achieved improvement of the deceleration behavior outweighs by far effects resulting from model simplifications, even in the purely model-based approach.

Since the driving dynamics control systems are generally reactive systems, in the case of the control interventions of a driving dynamics controller with reduction of the available recuperation, the recuperation reserve which is provided is in the worst case completely ineffective and at the same time the entire recuperatively provided deceleration torque has to be redistributed into the mechanical brake. Given skillful selection of the minimum recuperation (FIG. 2), there is a high probability that at the time of the intervention a mechanical brake pressure level is also sufficient for preconditioning, which ensures a clear increase in the available deceleration gradient of the mechanical brake.

Therefore, the case of "redistribution of driving dynamics control" also benefits significantly from the concept presented here—it is in fact not complete owing to a lack of available transient compensation. For the less common case of driving dynamics control intervention in the buildup range of the minimum recuperation, the transportation vehicle then behaves like a transportation vehicle without a second brake system. However, since the range of the "buildup of the minimum recuperation" takes place at the start of the deceleration maneuver with comparatively low deceleration over the ground, the behavior is still more favorable than a similar intervention at a high deceleration. It is, therefore, also mentioned here in a relativizing state that the intervention by the driving dynamics controller which is mentioned here actually has, of course, the objective of canceling the braking at the decelerated axle or axles by recuperation, to prioritize the transverse guidance over the longitudinal guidance. The loss of braking distance as a result of these interventions is, in particular, in the region of an appropriately selected minimum recuperation, equally small and unavoidable (as long as the control interventions are not predictable).

Even if the exemplary embodiment of the deceleration torque divider which is described here is described mainly in the context of the assistance systems (because the statement of the problem is correspondingly formulated), the use is not limited to this range.

For the sake of a continuous transportation vehicle architecture, in a first operation further requirements could also be made in respect of electronically ordered deceleration by this distributor. In a second operation, e.g., a brake-by-wire system could also divide the requirements from a "pedal simulator" or "joystick" among the available brake actuators via this distributor.

The limitation to recuperation and an electrohydraulic, mechanical brake is not necessary. In fact, the method can also be applied to further brake systems, assuming there is a suitable model of the slower actuator or of both actuators. An example would be the division of the deceleration between the retarder and service brake in a utility vehicle. In the case of the retarder, the emphasis would not be on the energy recovery but rather on the reduction of the TCO (total cost of ownership) through economical handling of the service brake which is subject to wear.

Even use in a conventional transportation vehicle with just one brake system is conceivable: here a reserve analogous to the recuperation reserve described above could be formed through active prestressing of the drive train with respect to the brake, which reserve can be used by reducing the drive torque. Application possibilities for this arise whenever the achievable brake dynamics have high priority over consumption—for example, in the case of parking systems, driving over a curbstone, a trailer maneuvering assistant or positioning assistant or when operating under rough offroad conditions.

Figure 3:
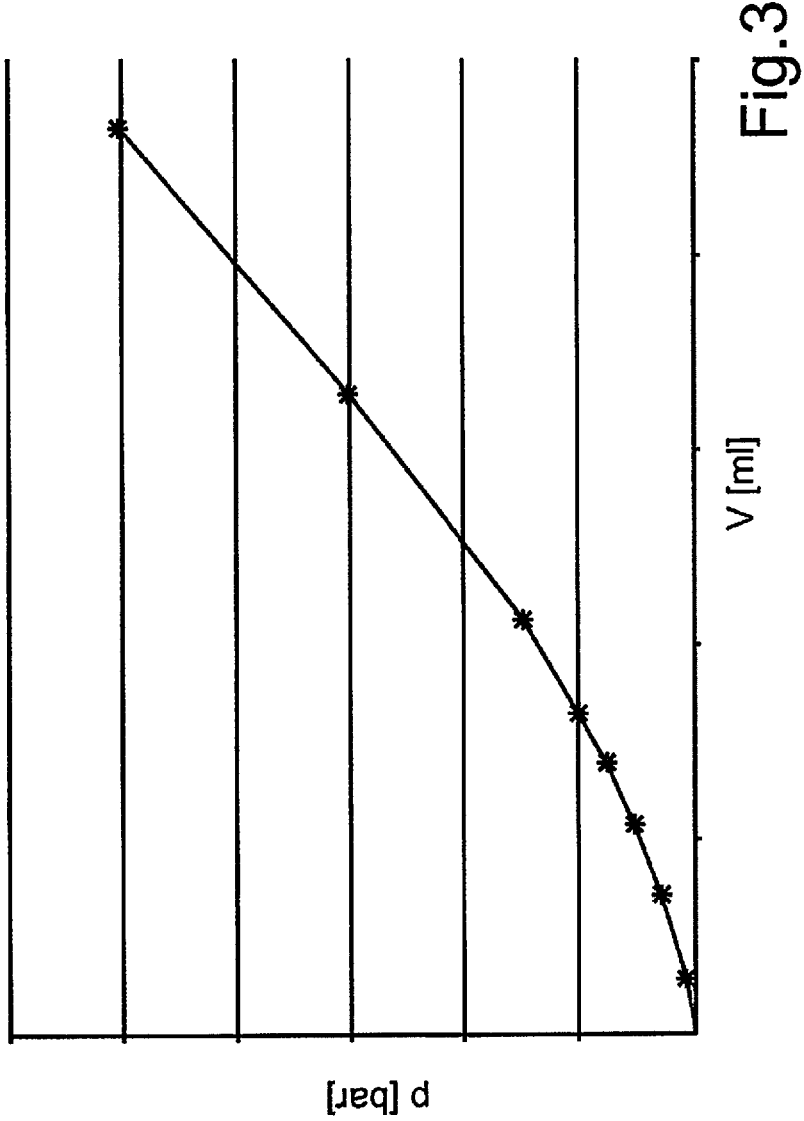
FIG. 3 shows a diagram with a schematic profile of a dependence of the brake pressure and the delivered brake fluid volume of the brake assembly.

FIG. 3 shows how, as is known, the pressure rise in the hydraulic system of the brake assembly again does not follow in a linear state but instead follows the respective p-V characteristic curve of the brake system (p=brake pressure, V=volume of the delivered brake fluid).

Each brake system has a characteristic curve which forms the relationship between the pressure and the volume in the system. This characteristic curve can be measured for a brake. In addition, the rotational speed of the pump which is permissible for the braking requirements and the geometry of the pump or directly the delivery volume per stroke can also be used over the development of the brake.

From the literature or also from the development of the brake it is also possible to obtain the coefficient with which a setpoint braking torque in the brake is converted into a pressure.

As is shown by FIG. 3, the brake pressure when plotted against the volume has a profile which is parabolic in a first approximation.

For the sake of simplification and to generate a continuous formulaic relationship (which can subsequently also be derived mathematically, because the primary interest is, of course, the achievable pressure gradient), a quadratic equation $$p(v)=av^2+bv+c$$

is formed. With the method of least squares it is possible to determine the coefficients of the equation. The quadratic coefficient (a) and linear coefficient (b) can be determined. The axle section (c) is assumed here in a fixed state with "0", which is a permissible simplification in view of the orders of magnitude of the pressure which occur during regular operation.

The formulas which are used are then derived. The available torque gradient of the brake is sought in accordance with the braking torque $$\frac{dM_B}{dt}(M_B)$$

which has already been set. If the requested braking torque is adjusted with the gradient to be calculated here, the current braking torque can easily also be calculated according to the model.

Given:
pressure/volume characteristic curve (p-V characteristic curve) of the brake, therefore, coefficients a,b of the quadratic equation which is used as the basis
relationship of the pressure and torque of the brake: $c_{Brake}$
geometry of the pump; volume per stroke: $c_{Pump}$
permissible rotational speed of the pump: $n_{Pump}$
It is:

$$p(v) = av^2 + bv$$

Therefore:

$$v(p) = \pm \frac{1}{2a}(\sqrt{4ap + b^2} - b)$$

And:

$$\frac{dp}{dv} = 2a \cdot v + b$$

... insert positive v(p) ...

$$\frac{dp}{dv}(p) = \sqrt{4a \cdot p + b^2}$$

The pump parameters can be calculated with respect to the available volume flow of the pump; the following applies:

$$\dot{V} = \frac{dV}{dt} \approx n_{Pump} \cdot c_{Pump} - p_{act} \cdot c_{Leakage}$$

... For the sake of simplification the leakage will be set as "0" ...

$$\frac{dV}{dt} = n_{Pump} \cdot c_{Pump} = c_{v,Pump}$$

The following applies:

$$\frac{dp}{dt} = \frac{dp}{dV} \cdot \frac{dV}{dt}$$

Inserted:

$$\frac{dp}{dt} = \sqrt{4a \cdot p + b^2} \cdot c_{v,Pump}$$

... and with a given pressure/torque relationship $C_{Brake}$ $$\frac{dM_B}{dt} = C_{Brake} \cdot \frac{dp}{dt} = \sqrt{4a \cdot p + b^2} \cdot c_{v,Pump} \cdot C_{Brake}$$

The simplifications which are made are:
1) The idle travel of the brake (distance between the brake lining and the disk) is not taken into account
   ==> effects resulting from this are taken up by the controller as interference variable.
2) Wear effects of the brake are still not taken into account
   ==> the model takes into account only an ideal brake. In the case of a worn brake, deviations can be taken up the controller.
3) The leakage losses of the pump are still not taken into account insofar as their linear portion is not contained in the specified delivery volume per stroke.
4) Temperature/wetness/temperature influences on the coefficients of friction of the brake are not taken into account.
5) The pressure controller in the brake assembly operates in an optimum state, and, therefore, utilizes the maximum pump rotational speed if there is a specific control difference (which can be taken into account in a parameterizable state, e.g., by a settable maximum value).
6) The run-up speed of the pump is negligible (actually in the range less than 100 ms).
7) Driving dynamics control and slip control are still not taken into account. In this case, the model tangentially assumes an excessively high pressure. However, in these situations an integrated controller can be frozen by the condition of the control slip intervention.

These simplifications may, therefore, all be made because taking them into account would give rise to a lower possible gradient in comparison with not taking them into account.

Alternatively, for the case of driving dynamics control, limitation of the available gradients to "0" is conceivable.

If this information is, therefore, used to calculate a freezing criterion for the controller, the freezing would take place with a delay compared to a concept without these simplifications, and, therefore, permit a certain windup (overshooting of the controller). This is not critical for the following reasons:
1) The available brake pressure gradient rises in a non-linear state with the delivered volume. A pressure gradient which cannot be achieved is always achievable at some point in the course of the further pressure buildup.
2) If no further pressure buildup is to take place (braking request constant), the pressure controller which is contained in the ESC will nevertheless continue to control until the requested brake pressure is reached.
3) If, owing to a pressure model which does not sufficiently take account of the state of wear of the hardware, the pressure controller of the ESC cannot compensate a static pressure fault as a result of gradients which are not reached, the superordinate kinematic acceleration controller will compensate this fault as an additional control fault in the deceleration.

The use of parameters of a worn brake assembly then does not give rise to incorrect behavior of the controller chain but rather to more conservative, earlier freezing of the integral controller in dynamic situations with the sole consequence of a possibly larger static or quasi-static control error in this dynamic situation (pilot control and P portion continue to be active).

Overall, the example shows how the disclosure makes it possible to make available a method for variable braking torque division of assistance functions between mechanical braking and recuperative braking.

LIST OF REFERENCE SYMBOLS

10 Transportation vehicle
11 Mechanical brake

12 Control device
13 Recuperation system
14 Driver assistance system
15 Signal
16 Recuperation signal
17 Electrical generator
18 Electrical energy store
19 Drive train coordinator
20 Total setpoint deceleration
21 Controller
22 Brake actuator
23 Dividing device
24 Mechanical setpoint braking torque
24' Strategic mechanical setpoint braking torque
25 Recuperative setpoint braking torque
25' Strategic recuperative setpoint braking torque
26 Strategic distributor
27 Model
28 Mechanical actual braking torque
29 Parameter
30 Actuator division
31 Compensation torque
32 Comparison
33 Data memory
34 Minimum recuperation
35 Recuperation reserve
36 Time gradient
37 Time gradient
38 Control error
39 Strategic recuperation limit
40 Available recuperation
I Transient torque buildup phase
T0 Point in time

The invention claimed is:

1. A method for compensating actuator dynamics of a mechanical brake of a transportation vehicle, the method comprising:
receiving, by a dividing device, a specification for a total setpoint deceleration of the transportation vehicle;
determining, by the dividing device, a mechanical setpoint braking torque in accordance with the total setpoint deceleration;
signaling, by the dividing device, the mechanical setpoint braking torque to the mechanical brake so that the mechanical brake adjusts a mechanical actual braking torque to the mechanical setpoint braking torque by operating a brake actuator, wherein, at least during a transient torque buildup phase of the actual braking torque, the actuator dynamics of the brake actuator have a limited time gradient which is lower than a time gradient of the signaled mechanical setpoint braking torque so that a control error is produced during the adjustment;
predicting, by the dividing device, the mechanical actual braking torque using a model of the brake actuator based on a current operating state of the brake actuator and based on the gradient of the mechanical setpoint braking torque; and
generating a compensation torque based on the predicted mechanical actual braking torque by actuating at least one predetermined transportation vehicle component which is different from the mechanical brake, which compensation torque brings about the total setpoint deceleration in the transportation vehicle,
wherein the dividing device receives the specification of the total setpoint deceleration at least once from an automatic cruise control system and/or a drive-by-wire system and/or from a drag torque simulation.

2. The method of claim 1, wherein the transportation vehicle component includes a recuperation system of the transportation vehicle and/or a retarder and the method further comprises actuating the recuperation system and/or the retarder, and generating the compensation torque as a braking torque and setting the compensation torque to a value of the control error in the transient torque buildup phase.

3. The method of claim 2, further comprising blending over onto the mechanical brake in response to a brake pedal being activated and/or there being a braking intervention signaled by a predetermined driver assistance system and/or there being a recuperation abort of a setpoint braking torque for the recuperation system and/or the retarder being gradually reduced, and the mechanical setpoint braking torque for the mechanical brake being increased.

4. The method of claim 2, wherein:
the total setpoint deceleration occurs without a request for the mechanical braking torque, and
wherein the dividing device nevertheless brings about only part of the total setpoint deceleration using the recuperation system and/or the retarder and brings about the remaining part of the total setpoint deceleration by the mechanical brake, and
wherein, as a result, the mechanical brake runs through the transient torque buildup phase.

5. The method of claim 2, wherein a recuperation operation of the recuperation system is already reduced before a recuperation limit of the recuperation system is reached, and as a result a recuperation reserve is set as a predetermined constant value or is set adaptively by a model in accordance with a current operating state of the brake actuator.

6. The method of claim 4, wherein the total setpoint deceleration is divided by dividing the total setpoint deceleration into at least a mechanical setpoint braking torque and a recuperative setpoint braking torque for the recuperation system,
wherein, for a total setpoint deceleration which is higher than a predetermined minimum value the total setpoint deceleration is also divided into a further setpoint braking torque for the retarder, and
wherein, for a total setpoint deceleration which is lower than the minimum value, the mechanical brake remains unactuated.

7. The method of claim 6, wherein the minimum value is set in a speed-dependent state.

8. The method of claim 1, wherein the mechanical brake is prestressed to prepare a braking maneuver by specifying the mechanical setpoint braking torque in the case of a total setpoint deceleration of 0, and a drive motor of the transportation vehicle is actuated, and the compensation torque is generated as the drive torque which is additionally generated by the drive motor, and the compensation torque is set to the value of the mechanical actual braking torque.

9. The method of claim 1, wherein the mechanical brake is a hydraulic brake, in which hydraulic brake actuator dynamics are produced with the limited time gradient by filling a brake system of the hydraulic brake with brake fluid in the torque buildup phase.

10. The method of claim 1, wherein the model approximates a functional relationship of the delivered brake fluid volume and the brake pressure which is brought about as a result, based on a second order polynomial.

11. A control device for a transportation vehicle, wherein a processor device of the control device is configured to carry out a method for compensating actuator dynamics of a mechanical brake of the transportation vehicle, the method including receiving a specification for a total setpoint deceleration of the transportation vehicle, determining a mechanical setpoint braking torque in accordance with the total setpoint deceleration, signaling the mechanical setpoint braking torque to the mechanical brake so that the mechanical brake adjusts a mechanical actual braking torque to the mechanical setpoint braking torque by operating a brake actuator, wherein, at least during a transient torque buildup phase of the actual braking torque, the actuator dynamics of the brake actuator have a limited time gradient which is lower than a time gradient of the signaled mechanical setpoint braking torque so that a control error is produced during the adjustment, predicting, by the mechanical actual braking torque using a model of the brake actuator based on a current operating state of the brake actuator and based on the gradient of the mechanical setpoint braking torque, and generating a compensation torque based on the predicted mechanical actual braking torque by actuating at least one predetermined transportation vehicle component which is different from the mechanical brake, which compensation torque brings about the total setpoint deceleration in the transportation vehicle, wherein the dividing device receives the specification of the total setpoint deceleration at least once from an automatic cruise control system and/or a drive-by-wire system and/or from a drag torque simulation.

12. The control device of claim 11, wherein the transportation vehicle component includes a recuperation system of the transportation vehicle and/or a retarder and the control device further comprises actuating the recuperation system and/or the retarder, and generating the compensation torque as a braking torque and setting the compensation torque to a value of the control error in the transient torque buildup phase.

13. The control device of claim 12, wherein blending over onto the mechanical brake is performed in response to a brake pedal being activated and/or there being a braking intervention signaled by a predetermined driver assistance system and/or there being a recuperation abort of a setpoint braking torque for the recuperation system and/or the retarder being gradually reduced, and the mechanical setpoint braking torque for the mechanical brake being increased.

14. The control device of claim 12, wherein:
the total setpoint deceleration occurs without a request for the mechanical braking torque, and
wherein the dividing device nevertheless brings about only part of the total setpoint deceleration using the recuperation system and/or the retarder and brings about the remaining part of the total setpoint deceleration by the mechanical brake, and
wherein, as a result, the mechanical brake runs through the transient torque buildup phase.

15. The control device of claim 12, wherein a recuperation operation of the recuperation system is already reduced before a recuperation limit of the recuperation system is reached, and as a result, a recuperation reserve is set as a predetermined constant value or is set adaptively by a model in accordance with a current operating state of the brake actuator.

16. The control device of claim 14, wherein the total setpoint deceleration is divided by dividing the total setpoint deceleration into at least a mechanical setpoint braking torque and a recuperative setpoint braking torque for the recuperation system,
wherein, for a total setpoint deceleration which is higher than a predetermined minimum value, the total setpoint deceleration is also divided into a further setpoint braking torque for the retarder, and
wherein, for a total setpoint deceleration which is lower than the minimum value, the mechanical brake remains unactuated.

17. The control device of claim 16, wherein the minimum value is set in a speed-dependent state.

18. The control device of claim 11, wherein the mechanical brake is prestressed to prepare a braking maneuver by specifying the mechanical setpoint braking torque in the case of a total setpoint deceleration of 0, and a drive motor of the transportation vehicle is actuated, and the compensation torque is generated as the drive torque which is additionally generated by the drive motor, and the compensation torque is set to the value of the mechanical actual braking torque.

19. The control device of claim 11, wherein the mechanical brake is a hydraulic brake, in which hydraulic brake actuator dynamics are produced with the limited time gradient by filling a brake system of the hydraulic brake with brake fluid in the torque buildup phase.

20. The control device of claim 11, wherein the model approximates a functional relationship of the delivered brake fluid volume and the brake pressure which is brought about as a result, based on a second order polynomial.

* * * * *